(12) United States Patent
Han

(10) Patent No.: US 11,801,532 B2
(45) Date of Patent: Oct. 31, 2023

(54) SORTING CONTROL METHOD, APPARATUS, PLATFORM AND SYSTEM, AND UNMANNED SORTING DEVICE

(71) Applicant: BEIJING JINGDONG ZHENSHI INFORMATION TECHNOLOGY CO., LTD., Beijing (CN)

(72) Inventor: Song Han, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/772,433

(22) PCT Filed: Aug. 18, 2020

(86) PCT No.: PCT/CN2020/109720
§ 371 (c)(1),
(2) Date: Apr. 27, 2022

(87) PCT Pub. No.: WO2021/082641
PCT Pub. Date: May 6, 2021

(65) Prior Publication Data
US 2022/0371054 A1    Nov. 24, 2022

(30) Foreign Application Priority Data

Oct. 29, 2019  (CN) .......................... 201911036058.0

(51) Int. Cl.
*B07C 3/08* (2006.01)
*B07C 3/14* (2006.01)
*B07C 1/04* (2006.01)

(52) U.S. Cl.
CPC .................. *B07C 3/08* (2013.01); *B07C 1/04* (2013.01); *B07C 2301/0066* (2013.01)

(58) Field of Classification Search
CPC ...... B07C 3/08; B07C 3/14; B07C 2301/0066
(Continued)

(56) References Cited

U.S. PATENT DOCUMENTS

2017/0190510 A1    7/2017  Porat
2018/0229843 A1    8/2018  Costanzo et al.
(Continued)

FOREIGN PATENT DOCUMENTS

CN        107055030 A      8/2017
CN        107225580 A     10/2017
(Continued)

OTHER PUBLICATIONS

"First Office Action and English language translation", CN Application No. 201911036058.0, dated Mar. 28, 2022, 25 pages.
(Continued)

*Primary Examiner* — Michael McCullough
*Assistant Examiner* — Jessica L Burkman
(74) *Attorney, Agent, or Firm* — Myers Bigel, P.A.

(57) ABSTRACT

The present invention discloses a sorting control method, apparatus, platform and system, and an unmanned sorting device. The sorting control method comprises controlling an unmanned sorting device to load a plurality of packages; obtaining package list information, and sending the package list information to a sorting control platform; receiving a sorting route planned by the sorting control platform; and controlling the unmanned sorting device to traverse a package list in order to travel according to the sorting route, and sequentially unloading the plurality of packages to corresponding destination sorting ports.

17 Claims, 6 Drawing Sheets

(58) Field of Classification Search
USPC .......................................................... 209/606
See application file for complete search history.

(56) References Cited

U.S. PATENT DOCUMENTS

| | | | |
|---|---|---|---|
| 2021/0031240 A1* | 2/2021 | Carpenter | ............... B07C 5/362 |
| 2021/0070546 A1 | 3/2021 | Li | |
| 2022/0288645 A1* | 9/2022 | Memon | .................. B07C 5/361 |

FOREIGN PATENT DOCUMENTS

| | | |
|---|---|---|
| CN | 107458828 A | 12/2017 |
| CN | 107824464 A | 3/2018 |
| CN | 107922048 A | 4/2018 |
| CN | 108401423 A | 8/2018 |
| CN | 108500949 A | 9/2018 |
| CN | 108792385 A | 11/2018 |
| CN | 208357253 U | 1/2019 |
| CN | 208527333 U | 2/2019 |
| WO | 2019049404 A1 | 3/2019 |

OTHER PUBLICATIONS

"International Search Report and the Written Opinion of the International Searching Authority with English language translation", International Application No. PCT/CN2020/109720, dated Nov. 26, 2020, 10 pages.

* cited by examiner

SORTING CONTROL METHOD, APPARATUS, PLATFORM AND SYSTEM, AND UNMANNED SORTING DEVICE

CROSS-REFERENCE TO RELATED APPLICATIONS

The present application is a U.S. National Stage Application under 35 U.S.C. § 371 of International Application No. PCT/CN2020/109720, filed on Aug. 18, 2020, which is based on and claims priority to China Patent Application No. 201911036058.0 filed on Oct. 29, 2019, the disclosures of both of which are incorporated by reference herein in their entireties.

TECHNICAL FIELD

The present disclosure relates to the field of warehousing, and in particular, to a sorting control method, apparatus, platform and system, and an unmanned sorting device.

BACKGROUND

In the production of warehouse in the related art, automated devices have been used on a large scale, and unmanned devices are particularly used. Moreover, a large number of unmanned devices are used in the package sorting process to improve the sorting efficiency.

SUMMARY

According to one aspect of the present disclosure, a sorting control method is provided. The method comprises the steps of: controlling an unmanned sorting device to load a plurality of packages; obtaining package list information, and sending the package list information to a sorting control platform; receiving a sorting route planned by the sorting control platform; and controlling the unmanned sorting device to traverse the package list to travel according to the sorting route, and unloading the plurality of packages to corresponding destination sorting ports in sequence.

In some embodiments of the present disclosure, the step of controlling the unmanned sorting device to traverse the package list to travel according to the sorting route, and unloading the plurality of packages to corresponding destination sorting ports in sequence includes: controlling the unmanned sorting device to reach the destination sorting port of a package to be sorted; obtaining ground positioning coordinates by controlling a landmark camera; determining whether the current sorting port is the destination sorting port of the package to be sorted; and unloading the package to be sorted into the destination sorting port in the case where the current sorting port is the destination sorting port of the package to be sorted.

In some embodiments of the present disclosure, the step of controlling an unmanned sorting device to load a plurality of packages includes: controlling the unmanned sorting device to load a plurality of packages from supply stations or shelves; the sorting control method further comprising: determining whether there is a package that is not sorted by the unmanned sorting device; performing the step of controlling the unmanned sorting device to reach the destination sorting port of the package to be sorted in the case where there is a package that is not sorted by the unmanned sorting device; and controlling the unmanned sorting device to travel to the package supply stations or shelves, and performing the step of controlling the unmanned sorting device to load a plurality of packages in the case where there is not a package that is not sorted by the unmanned sorting device.

In some embodiments of the present disclosure, the sorting control method further comprises: determining whether a sorting start instruction is received or whether the unmanned sorting device is fully loaded; performing the step of obtaining the package list information and sending the package list information to the sorting control platform in the case where a sorting start instruction is received or the unmanned sorting device is fully loaded; and proceeding to perform the step of controlling the unmanned sorting device to load a plurality of packages in the case where a sorting start instruction is not received and the unmanned sorting device is not fully loaded.

In some embodiments of the present disclosure, the sorting control method further comprises: determining whether the package to be sorted has been unloaded into the destination sorting port by a package sensing device; and informing the sorting control platform that the current package sorting is completed, and then proceeding to perform the step of traversing the package list to travel according to the sorting route in the case where the package to be sorted has been unloaded into the destination sorting port.

In some embodiments of the present disclosure, the step of unloading the package to be sorted to the destination sorting port includes: controlling a plurality of layers of package conveyor belts to convey the package to be sorted and conveying the package to be sorted to the destination sorting port.

According to another aspect of the present disclosure, a sorting control apparatus is provided. The sorting control apparatus comprises: a loading control module configured to control the unmanned sorting device to load a plurality of packages; a package information sending module configured to obtain package list information and send the package list information to a sorting control platform; a sorting route receiving module configured to receive a sorting route planned by the sorting control platform; and an unloading control module configured to control the unmanned sorting device to traverse the package list to travel according to the sorting route, and unload the plurality of packages to corresponding destination sorting ports in sequence.

In some embodiments of the present disclosure, the sorting control apparatus is configured to perform operations of implementing the sorting control method according to any one of the above-described embodiments.

According to another aspect of the present disclosure, a sorting control apparatus is provided. The sorting control apparatus comprises: a memory for storing instructions; and a processor configured to execute the instructions, so that the sorting control apparatus performs operations of implementing the sorting control method according to any one of the above-described embodiments.

According to another aspect of the present disclosure, an unmanned sorting device is provided. The device comprises: a package scanning camera provided on the top of the unmanned sorting device, and configured to collect the package information, identify packages, and send the package information to the sorting control apparatus in the case where the unmanned sorting device loads a plurality of packages; and a configured to obtain package list information, and send the package list information to a sorting control platform, so as to allow the sorting control platform to plan a sorting route; receive the sorting route planned by the sorting control platform; control the unmanned sorting device to traverse the package list to travel according to the sorting route, and unload the plurality of packages to corresponding destination sorting ports in sequence.

In some embodiments of the present disclosure, the unmanned sorting device further comprises a landmark camera, wherein: the sorting control apparatus is further configured to control the unmanned sorting device to reach the destination sorting port of the package to be sorted, wherein a plurality of sorting ports are provided on the ground, and one sorting port corresponds to one package destination; the landmark camera is provided at the bottom of the unmanned sorting device, and configured to position the ground landmarks, so as to allow the sorting control apparatus to determine whether the current sorting port is the destination sorting port of the package to be sorted, wherein one ground landmark is configured to identify one sorting port; and the sorting control apparatus is further configured to unload the package to be sorted to the destination sorting port in the case where the current sorting port is the destination sorting port of the package to be sorted. In some embodiments of the present disclosure, the unmanned sorting device further comprises: a vehicle body package sorting outlet provided at the bottom of the vehicle body, wherein the sorting control apparatus is further configured to control the vehicle body package sorting outlet aligned with a sorting port, so that the package to be sorted are unloaded into the destination sorting port through the vehicle body package sorting outlet.

In some embodiments of the present disclosure, the unmanned sorting device further comprises: a package sensing device configured to detect whether a package falls into the destination sorting port in the case where the package reaches the destination sorting port and the package is sorted and unloaded; and send a message to the sorting control apparatus to indicate that the package has been successfully sorted in the case where the package falls into the destination sorting port.

In some embodiments of the present disclosure, the unmanned sorting device further comprises: a plurality of layers of package conveyor belts, provided in unmanned sorting device, and configured to isolate and convey the packages in sequence.

In some embodiments of the present disclosure, the unmanned sorting device further comprises: a universal wheel configured to drive the unmanned sorting device to move forwards, backwards, leftwards and rightwards according to the instructions of the sorting control apparatus; and a power unit configured to provide power for the movement of the vehicle body and the movement of the package conveyor belt.

In some embodiments of the present disclosure, the sorting control apparatus is the sorting control apparatus according to any one of the above-described embodiments.

According to another aspect of the present disclosure, a sorting control system is provided. The system comprises a sorting control platform configured to receive the package list information sent by an unmanned sorting device; plan a sorting route according to the package list information, and send the sorting route to the unmanned sorting device; and the unmanned sorting device configured to control the unmanned sorting device to load a plurality of packages, obtain the package list information, and send the package list information to the sorting control platform, receive the sorting route planned by the sorting control platform, control the unmanned sorting device to traverse the package list to travel according to the sorting route, and unload a plurality of packages to corresponding destination sorting ports in sequence, wherein the unmanned sorting device is the sorting control apparatus according to any one of the above-described embodiments.

In some embodiments of the present disclosure, the sorting control system further comprises: sorting ports provided on the ground, wherein one sorting port corresponds to one package destination; ground landmarks provided on the ground and configured to identify sorting ports, wherein one ground landmark is configured to identify one sorting port, wherein the unmanned sorting device is further configured to sort the packages according to the ground landmark, and unload the packages after reaching the landmark of the destination sorting port.

According to another aspect of the present disclosure, a non-transient computer-readable storage medium is provided, wherein the non-transient computer-readable storage medium stores computer instructions that, when executed by a processor, implement the sorting control method according to any one of the above-described embodiments.

BRIEF DESCRIPTION OF THE ACCOMPANYING DRAWINGS

In order to more explicitly explain the embodiments of the present disclosure or the technical solutions in the relevant art, a brief introduction will be given below for the accompanying drawings required to be used in the description of the embodiments or the relevant art. It is obvious that, the accompanying drawings described as follows are merely some of the embodiments of the present disclosure. For those skilled in the art, other accompanying drawings may also be obtained according to such accompanying drawings on the premise that no inventive effort is involved.

DETAILED DESCRIPTION

The technical solution in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following descriptions of at least one exemplary embodiment which are in fact merely illustrative, shall by no means serve as any delimitation on the present disclosure as well as its application or use. On the basis of the embodiments of the present disclosure, all the other embodiments obtained by those skilled in the art on the premise that no inventive effort is involved shall fall into the protection scope of the present disclosure.

Unless otherwise specified, the relative arrangements, numerical expressions and numerical values of the components and steps expounded in these examples shall not limit the scope of the present invention.

At the same time, it should be understood that, for ease of description, the dimensions of various parts shown in the accompanying drawings are not drawn according to actual proportional relations.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The technical solution in the related art is generally implemented based on a flap AGV (Automated Guided Vehicle), but the current efficiency of this solution is much higher than that of manual work, even though there is still space to be improved.

In view of at least one of the above technical problems, the present disclosure provides a sorting control method, apparatus, platform and system, and an unmanned sorting device, which improve the efficiency of sorting packages in a warehouse.

Figure 1:
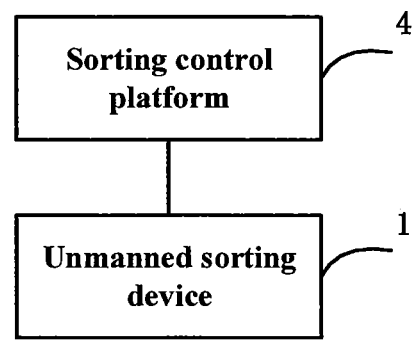
FIG. 1 is a schematic view of some embodiments of the sorting control system according to the present disclosure.

FIG. 1 is a schematic view of some embodiments of the sorting control system according to the present disclosure. As shown in FIG. 1, the sorting control system according to the present disclosure may comprise a sorting control platform 4 and an unmanned sorting device 1.

The sorting control platform 4 is configured to receive the package list information sent by the unmanned sorting device 1; plan a sorting route according to the package list information, and deliver the sorting route to the unmanned sorting device 1.

The unmanned sorting device 1 comprises a sorting control apparatus, wherein the sorting control apparatus is configured to control the unmanned sorting device 1 to travel to the package supply stations or shelves, and load a plurality of packages automatically or manually; obtain the package list information, and send the package list information to the sorting control platform 4; and receive the sorting route planned by the sorting control platform 4. The unmanned sorting device 1 is controlled to traverse the package list to travel according to the sorting route, and unload the plurality of packages to corresponding destination sorting ports in sequence.

In some embodiments of the present disclosure, the package supply stations may be package sorting stations.

In some embodiments of the present disclosure, the unmanned sorting device 1 may be implemented as a sorting vehicle.

The sorting control system provided on the basis of the above-described embodiments of the present disclosure, which is more efficient than the flap truck in the related art, may sort a plurality of packages at the same time, and improve the sorting efficiency.

Figure 2:
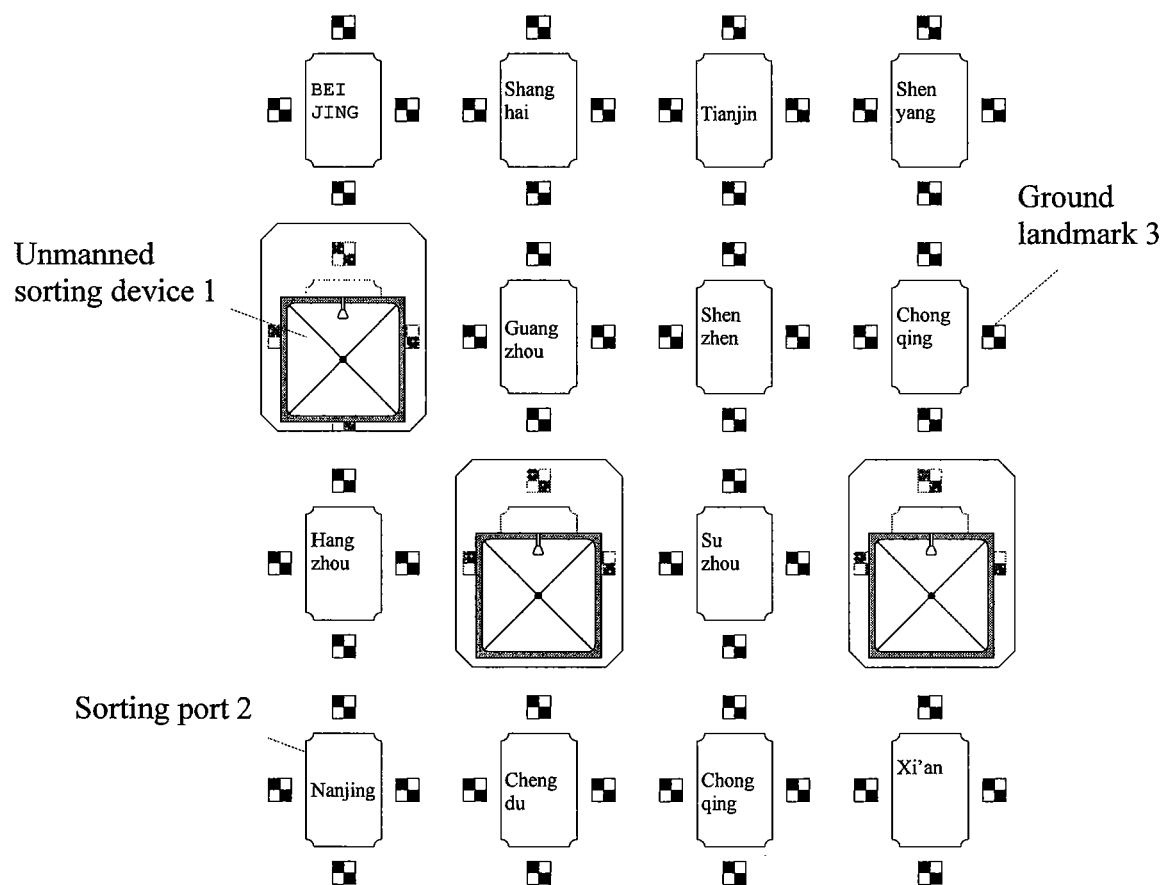
FIG. 2 is a schematic view of other embodiments of the sorting control system according to the present disclosure.

FIG. 2 is a schematic view of other embodiments of the sorting control system according to the present disclosure. In addition to containing the sorting control platform 4 (not shown in FIG. 2) and the unmanned sorting device 1 in the embodiment of FIG. 1, the sorting control system of the embodiment of FIG. 2 may also include a sorting port (a package sorting port) 2 and a ground landmark 3, wherein:

The sorting port 2 and the ground landmark 3 are provided on the ground, wherein one sorting port 2 corresponds to one package destination.

In some embodiments of the present disclosure, one sorting port 2 corresponds to one destination such as a station or a city, and the sorting vehicle travels to a corresponding sorting port 2 according to the destination station or the destination city of the package to unload the package.

In some embodiments of the present disclosure, the sorting port 2 has a package unloading port in the ground, such that after entering the port, the package may be flowed to a turnover box or a turnover bag, and loaded and conveyed to the destination.

In some embodiments of the present disclosure, as shown in FIG. 1, each sorting port 2 may correspond to one destination city such as Beijing, Shanghai, and Nanjing.

The ground landmark 3 is configured to identify the sorting port 2, wherein one ground landmark 3 is configured to identify one sorting port 2. The unmanned sorting device 1 is configured to sort the packages and travel according to the ground landmarks 3, and unload the packages after reaching the landmark of the destination sorting ports.

In some embodiments of the present disclosure, as shown in FIG. 1, four ground landmarks 3 may be provided around in the front, back, left and right of each sorting port 2.

In some embodiments of the present disclosure, the unmanned sorting device 1 may be a sorting vehicle; and the ground landmark 3 may be a sorting vehicle landmark.

In some embodiments of the present disclosure, the unmanned sorting device 1 is configured to convey the carried packages to corresponding sorting ports 2, and drain the packages from the bottom of the vehicle body to specific ports.

In some embodiments of the present disclosure, a plurality of unmanned sorting devices 1 may be provided in one warehouse.

For example: in the embodiment of FIG. 2, the sorting control system may include three unmanned sorting devices 1 which run in the sorting area including sixteen sorting ports 2, and four ground landmarks 3 are provided around each sorting port 2.

In some embodiments of the present disclosure, the unmanned sorting device 1 of the present disclosure may be configured to load a plurality of packages on supply stations or shelves; obtain the package list information, send the package list information to the sorting control platform 4; receive the sorting route planned by the sorting control platform 4; traverse the package list to travel according to the sorting route, and unload the plurality of packages to the corresponding destination sorting ports in sequence.

In the sorting control system provided on the basis of the above-described embodiments of the present disclosure, as compared with the flap truck in the related art, the unmanned sorting device (an unmanned sorting vehicle) contained therein loads more packages at a time (the flap AGV only transfer one package at a time). In the above-described embodiments of the present disclosure, the packages are sorted in a faster speed, and an independent travel lane is not required, while an independent travel lane is required for the flap truck in the related art.

The above-described embodiments of the present disclosure provide an AGV capable of efficient automatic sorting, which is more efficient than the flap truck previously in the related art. In the above-described embodiments of the present disclosure, it is possible to sort a plurality of packages at the same time, thereby improving the sorting efficiency.

The following specific embodiments will explain the structure and function of the unmanned sorting device 1 in the embodiment of FIG. 1 or FIG. 2.

Figure 3:
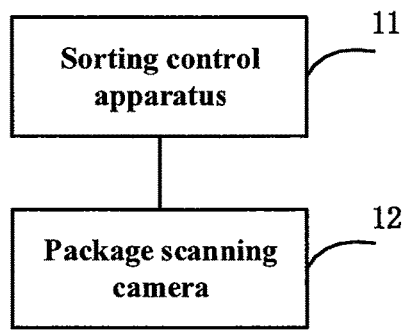
FIG. 3 is a schematic view of some embodiments of the unmanned sorting device according to the present disclosure.

FIG. 3 is a schematic view of some embodiments of the unmanned sorting device according to the present disclosure. As shown in 3, the unmanned sorting device according to the present disclosure (for example, the unmanned sorting device 1 in the embodiment of FIG. 1 or FIG. 2) may include a sorting control apparatus 11 and a package scanning camera 12, wherein, the package scanning camera 12 is provided on the top of the unmanned sorting device 1.

The package scanning camera 12 is configured to collect the package information, and identify the packages in the case where the unmanned sorting device 1 loads a plurality of packages on the package supply stations or shelves, and send the package information to the sorting control apparatus.

The sorting control apparatus 11 is configured to obtain the package list information, and send the package list information to the sorting control platform 4, so as to allow the sorting control platform 4 to plan a sorting route; receive the sorting route planned by the sorting control platform 4; control the unmanned sorting device 1 to transverse the package list to travel according to the sorting route, and unload a plurality of packages to the corresponding destination sorting ports in sequence.

In some embodiments of the present disclosure, the unmanned sorting device according to the present disclosure may be implemented as an unmanned sorting vehicle.

Figure 4:
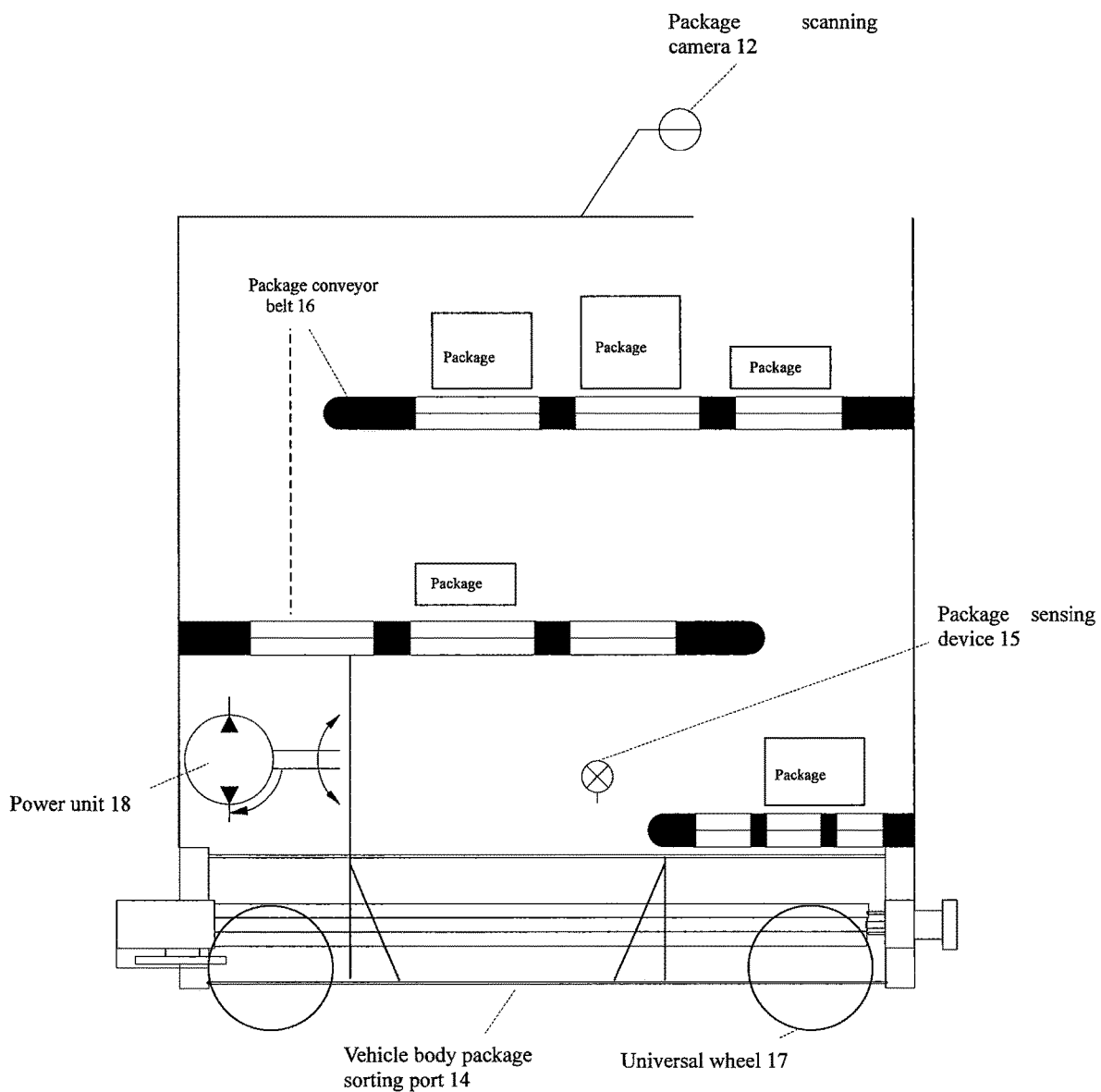
FIG. 4 is a schematic side view of other embodiments of the unmanned sorting device according to the present disclosure.
Figure 5:
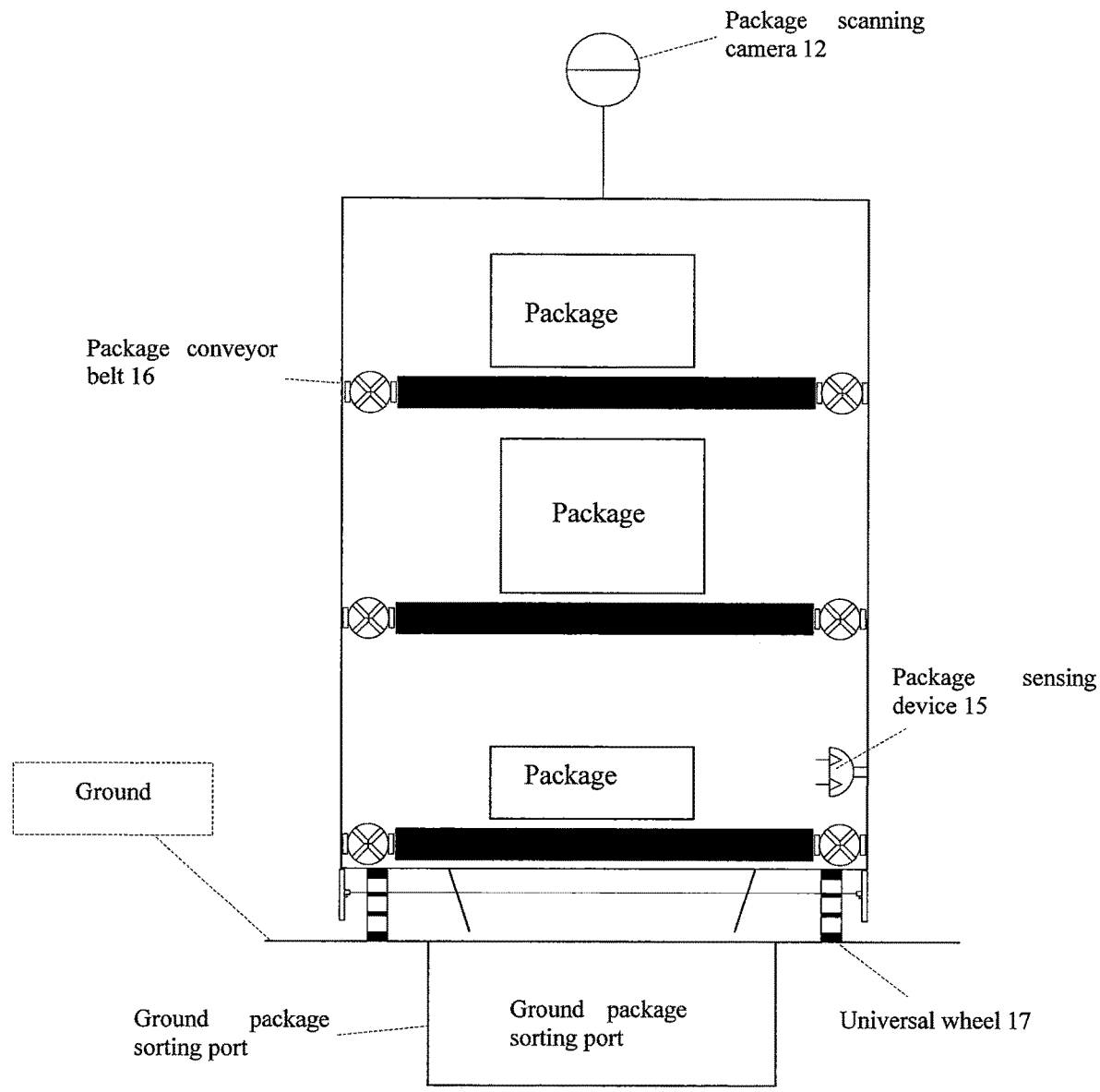
FIG. 5 is a schematic front view of other embodiments of the unmanned sorting device according to the present disclosure.
Figure 6:
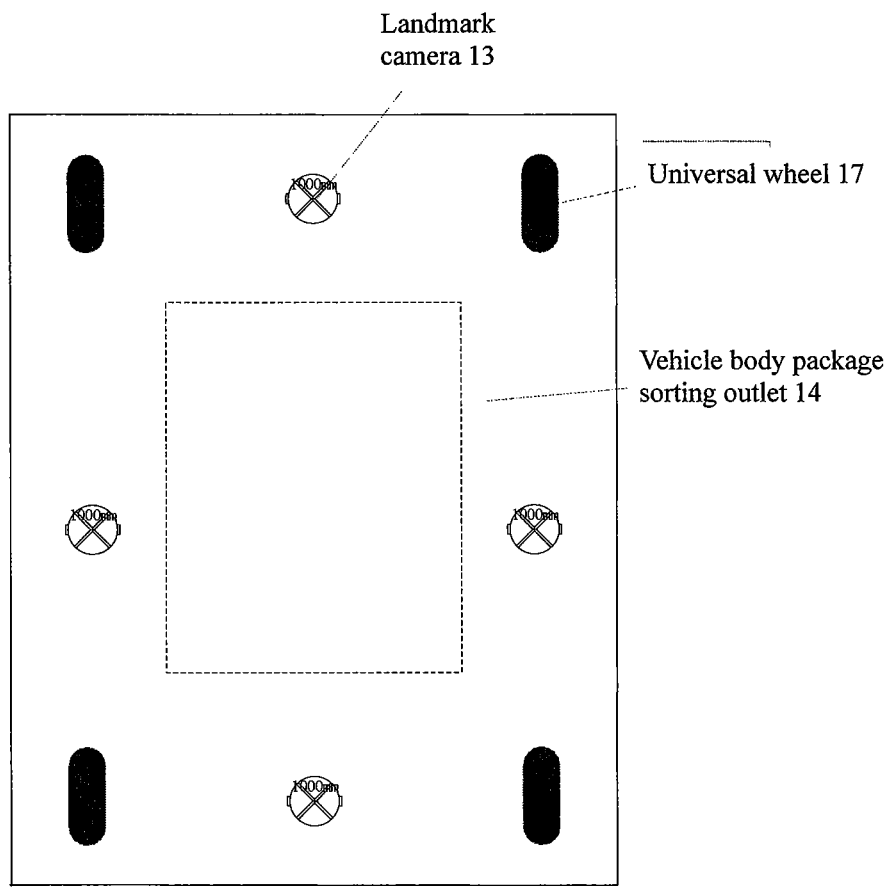
FIG. 6 is a schematic bottom view of other embodiments of the unmanned sorting device according to the present disclosure.

FIG. 4 is a schematic side view of other embodiments of the unmanned sorting device according to the present disclosure. FIG. 5 is a schematic front view of other embodiments of the unmanned sorting device according to the present disclosure. FIG. 6 is a schematic bottom view of other embodiments of the unmanned sorting device according to the present disclosure. In addition to containing the sorting control apparatus 11 (not shown in FIGS. 4-6) and the package scanning camera 12 in the embodiment of FIG. 3, the unmanned sorting device in the embodiments of FIGS. 4-6 may also include a landmark camera 13 (as shown in FIG. 6).

The sorting control apparatus 11 is configured to control the unmanned sorting device 1 to reach the destination sorting port of the package to be sorted, wherein a plurality of sorting port 2 are provided on the ground, and one sorting port 2 corresponds to one package destination.

The landmark camera 13 is provided at the bottom of the unmanned sorting device 1, and configured to scan the ground landmark 3, so as to allow the sorting control apparatus 11 to determine whether the current sorting port is the destination sorting port of the package to be sorted, wherein one ground landmark 3 is configured to identify one sorting port 2, and the current sorting port is the sorting port 2 currently reached by the unmanned sorting device 1.

The sorting control apparatus 11 is further configured to unload the package to be sorted into the destination sorting port in the case where the current sorting port is the destination sorting port of the package to be sorted.

In some embodiments of the present disclosure, the landmark camera 13 is a device at the bottom of the unmanned sorting device 1 configured to identify the ground landmark, and the unmanned sorting device 1 controls the traveling direction by identifying the landmark information.

In some embodiments of the present disclosure, the number and position of the landmark cameras 13 correspond to the number and position of the ground landmarks.

For example, in the embodiment of FIG. 6, the unmanned sorting device contains four landmark cameras 13 to respectively position four ground landmarks in the front, back, left and right of the sorting port 2, so as to implement accurately positioning of the destination sorting port.

In some embodiments of the present disclosure, as shown in FIGS. 4-6, the unmanned sorting device 1 may further include a vehicle body package sorting outlet 14, wherein, the vehicle body package sorting outlet 14 is provided at the bottom of the vehicle body.

The sorting control apparatus 11 is configured to control the vehicle body package sorting outlet 14 aligned with the sorting port 2 (i.e., the ground package sorting port as shown in FIG. 5), so that the vehicle body package sorting outlet 14 unloads the package to be sorted into the destination sorting port. The ground package sorting port has a package unloading port in the ground. After entering the ground package sorting port, the package may be flowed to a turnover box or a turnover bag, and loaded and conveyed to the destination.

In some embodiments of the present disclosure, as shown in FIGS. 4 and 5, the unmanned sorting device 1 may further include a package sensing device 15, wherein, the package sensing device 15 is configured to detect whether the package falls into the destination sorting port in the case where the package reaches the destination sorting port for sorting and unloading the package; and send a message to indicate that the package has been sorted successfully in the case where the package falls into the destination sorting port.

In the above-described embodiments of the present disclosure, when it is required to sort and unload the package after one package reaches the destination sorting port, the package sensing device may be triggered to indicate that the package has been sorted successfully in the case where the package falls into the sorting port.

In some embodiments of the present disclosure, as shown in FIGS. 4 and 5, the unmanned sorting device 1 may further include package conveyor belts 16, wherein, a plurality of layers of package conveyor belts 16 are provided in the unmanned sorting device 1.

The package conveyor belts 16 are configured to isolate and convey the packages in sequence in the unmanned sorting device 1.

In some embodiments of the present disclosure, the unmanned sorting device 1 may contain several layers of package conveyor belts 16, so that it is possible to load several more packages, and isolate the packages in sequence so as to ensure the sequence.

In some embodiments of the present disclosure, as shown in FIGS. 4 and 5, the unmanned sorting device 1 may include three layers of package conveyor belts 16.

In some embodiments of the present disclosure, the unmanned sorting device 1 may also not include a package conveyor belt, but use a lattice box in the form of a package locker in the community for loading the packages.

In some embodiments of the present disclosure, as shown in FIGS. 4-6, the unmanned sorting device 1 may further include a universal wheel 17 and a power unit 18.

The universal wheel 17 is configured to drive the unmanned sorting device 1 to move forwards, backwards, leftwards and rightwards according to the instruction of the sorting control apparatus 11.

The power unit 18 is configured to provide the power for the movement of the vehicle body and the power for the movement of the package conveyor belt 16.

In the unmanned sorting device (unmanned sorting vehicle) provided on the basis of the above-described embodiments of the present disclosure, as compared with the flap truck in the related art, a plurality of packages are loaded at a time (the flap AGV only transfer one package at a time). In the above-described embodiments of the present disclosure, the packages are sorted in a faster speed, and an independent travel lane is not required, while an independent travel lane is required for the flap truck in the related art.

The above-described embodiments of the present disclosure provide an AGV capable of efficient automatic sorting, which is more efficient than the flap truck previously in the related art. In the above-described embodiments of the present disclosure, it is possible to sort a plurality of packages at the same time, thereby improving the sorting efficiency.

Figure 7:
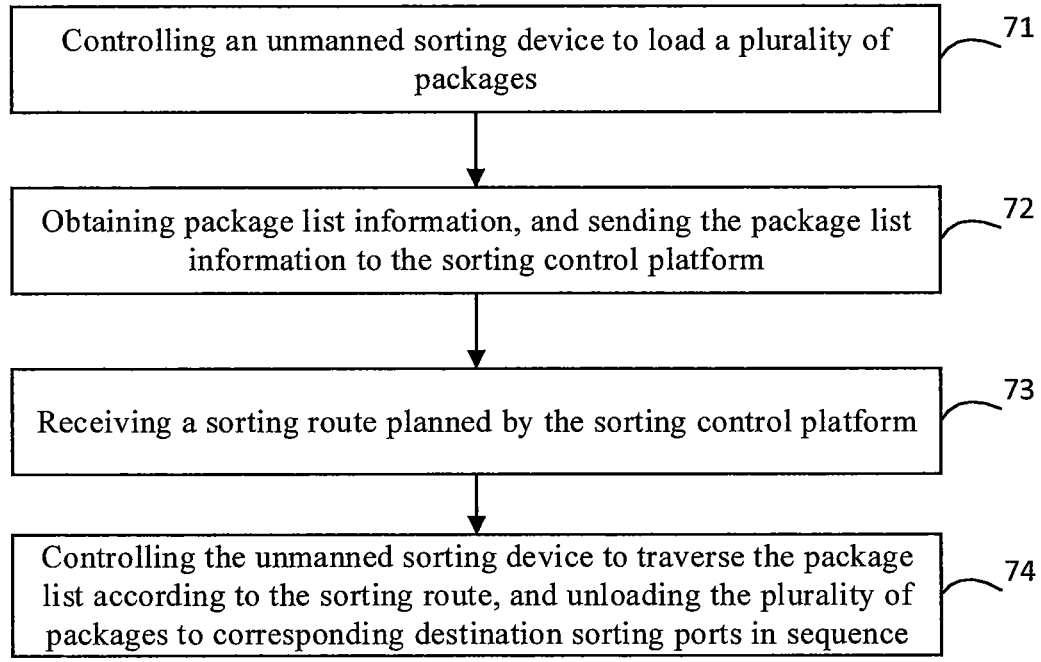
FIG. 7 is a schematic side view of some embodiments of the sorting control method according to the present disclosure.

FIG. 7 is a schematic side view of some embodiments of the sorting control method according to the present disclosure. Preferably, this embodiment may be performed by the sorting control apparatus (for example, the sorting control apparatus 11 in the embodiment of FIG. 3) or the unmanned sorting device (for example, the sorting control apparatus according to any of the embodiments of FIGS. 1 to 6) of the present disclosure. The method may comprise the following steps of step 71 to step 74.

In step 71: the unmanned sorting device 1 is controlled to load a plurality of packages.

In some embodiments of the present disclosure, the step 71 may include: controlling the unmanned sorting device 1 to travel to package supply stations or shelves, and loading a plurality of packages to the unmanned sorting device 1 automatically or manually.

In step 72: the package list information is obtained, and the package list information is sent to the sorting control platform 4.

In step 73: the sorting route planned by the sorting control platform 4 is received.

In step 74: the unmanned sorting device 1 is controlled to transverse the package list to travel according to the sorting route, and the plurality of packages are loaded to corresponding destination sorting ports in sequence.

In some embodiments of the present disclosure, the step 74 may include; the unmanned sorting device 1 is controlled to reach the destination sorting port of the package to be sorted; the ground positioning coordinates are obtained by controlling the landmark camera whether the current sorting port is the destination sorting port of the package to be sorted is determined, wherein the current sorting port is the sorting port 2 currently reached by the unmanned sorting device 1; and the package to be sorted is unloaded to the destination sorting port in the case where the current sorting port is the destination sorting port of the package to be sorted.

In some embodiments of the present disclosure, after the step 74, or during the step 74, the sorting control method may further include: determining whether there is a package that is not sorted by the unmanned sorting device 1; continuing to perform the step 74 to control the unmanned sorting device 1 to reach the destination sorting port of the package to be sorted in the case that there is a package that is not sorted by the unmanned sorting device 1; controlling the unmanned sorting device 1 to travel to the package supply stations or shelves, and performing the step 71 in the case where there is not a package that is not sorted by the unmanned sorting device 1.

In some embodiments of the present disclosure, after the step 71 or during the step 71, the sorting control method may further include: determining whether a sorting start instruction is received or whether the unmanned sorting device 1 is fully loaded; performing the step 72 in the case where a sorting start instruction is received or the unmanned sorting device 1 is fully loaded; and proceeding to perform the step 71 in the case where a sorting start instruction is not received and the unmanned sorting device 1 is not fully loaded.

In some embodiments of the present disclosure, after the step 74, the sorting control method may further include: determining whether the package to be sorted has been unloaded into the destination sorting port by the package sensing device 15; informing the sorting control platform 4 that the current package sorting is completed, and then proceeding to perform the step 74 of transferring the package list to travel according to the sorting route in the case where the package to be sorted has been unloaded into the destination sorting port.

Figure 8:
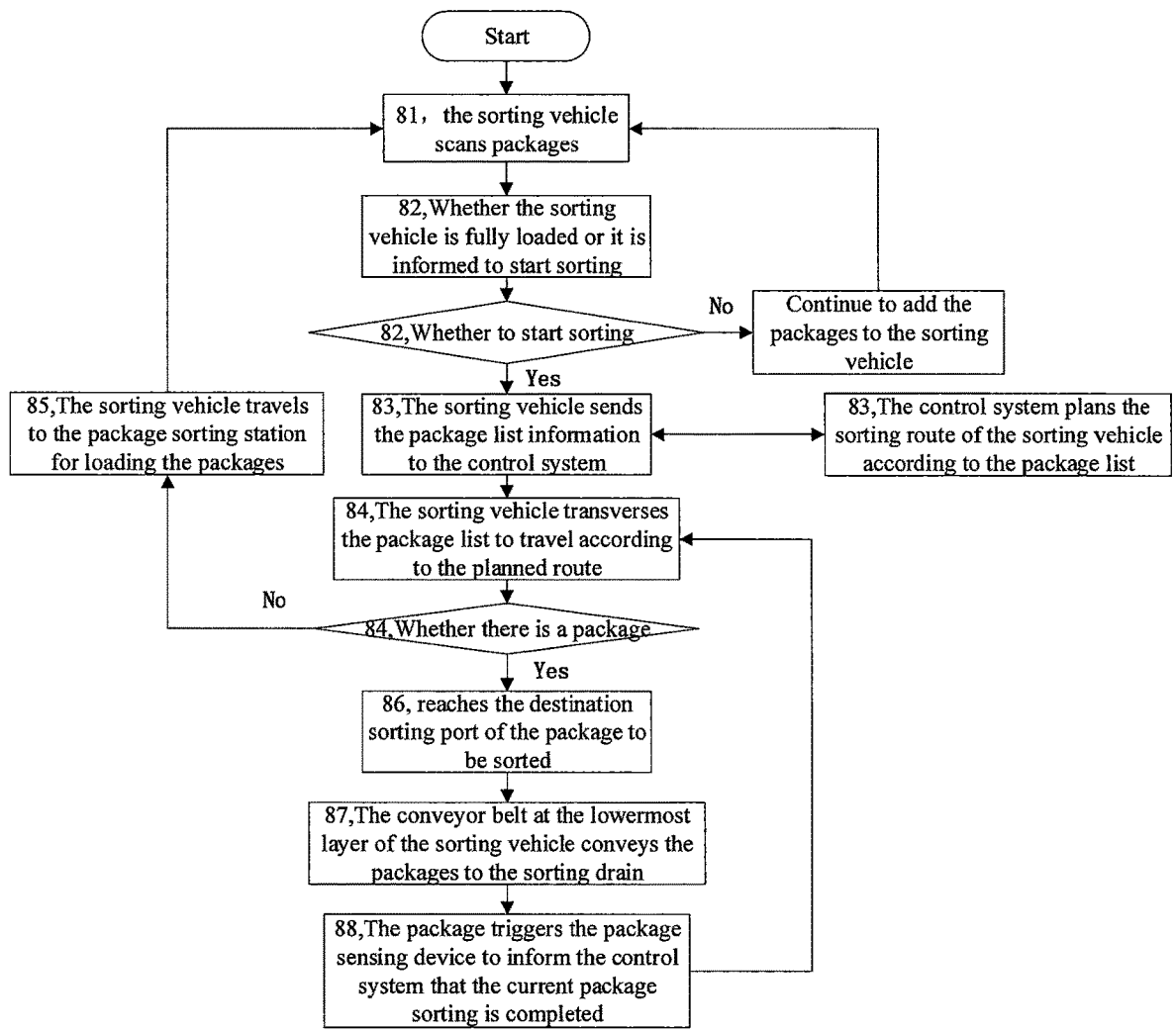
FIG. 8 is a schematic side view of other embodiments of the sorting control method according to the present disclosure.

FIG. 8 is a schematic side view of other embodiments of the sorting control method according to the present disclosure. Preferably, this embodiment may be performed by the sorting control apparatus (for example, the sorting control apparatus 11 in the embodiment of FIG. 3) or the unmanned sorting device (for example, a sorting vehicle) according to the present disclosure. The method may include the following steps of step 81 to step 88.

In step 81: the sorting vehicle loads the packages on the package supply stations or shelves, which may be loaded manually or automatically. Each package is scanned by the sorting vehicle, such that the sorting vehicle identifies the package.

In step 82: after the sorting vehicle scans each package, it is determined whether the sorting vehicle is fully loaded (the conveyor belt of each sorting vehicle has a certain package carrying capacity) or whether it is manually triggered to start sorting (the vehicle may be manually triggered if the vehicle is not fully loaded); if not, proceed to perform the step 81; if so, perform the step 82.

In step 83: the sorting vehicle sends the information of the package list to the control system, such that the control system plans the sorting route of the sorting vehicle according to the package list and returns the sorting route to the sorting vehicle.

In step 84: the sorting vehicle traverses the package list to travel according to the planned route. If there is no package that is not sorted, the step 85 is performed; if there is a package that is not sorted, the step 86 is performed.

In step 85: the sorting vehicle travels to the package sorting station to load the packages, and then the step 81 is performed.

In step 86: the sorting vehicle reaches the destination sorting port of the package to be sorted, and the ground coordinates are scanned by the landmark camera 13, and the sorting port 2 is determined as the destination sorting port of the package to be sorted.

In step 87: the conveyor belt at the lowermost layer of the sorting vehicle conveys the package to be sorted to the sorting port 2.

In step 88: after the package falls into the sorting port 2, the package sensing device 15 may be triggered, and the sorting vehicle informs the control system that the current package sorting is completed; and the step 84 is performed.

In the sorting control method provided on the basis of the above-described embodiments of the present disclosure, as compared with the flap truck in the related art, it is more efficient and a plurality of packages are loaded at a time. In the above-described embodiments of the present disclosure, the packages are sorted in a faster speed, and an independent travel lane is not required, while an independent travel lane is required for the flap truck in the related art. In the above-described embodiments of the present disclosure, it is possible to sort a plurality of packages at the same time, thereby improving the sorting efficiency.

Figure 9:
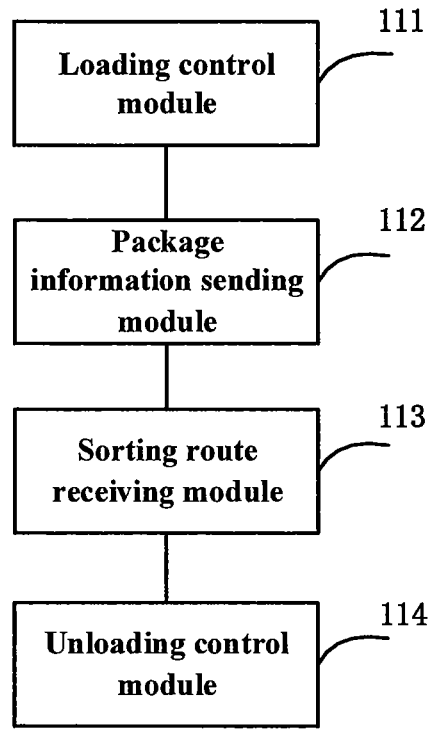
FIG. 9 is a schematic side view of some embodiments of the sorting control apparatus according to the present disclosure.

FIG. 9 is a schematic side view of some embodiments of the sorting control apparatus according to the present disclosure. As shown in FIG. 9, the sorting control apparatus according to the present disclosure (for example, the sorting control apparatus 11 according to the embodiment of FIG. 3) may include a loading control module 111, a package information sending module 112, a sorting route receiving module 113 and an unloading control module 114.

The loading control module 111 is configured to control the unmanned sorting device 1 to load a plurality of packages on the package supply stations or shelves automatically or manually.

The package information sending module 112 is configured to obtain the package list information and send the package list information to the sorting control platform 4.

The sorting route receiving module 113 is configured to receive the sorting route planned by the sorting control platform 4.

The unloading control module 114 is configured to control the unmanned sorting device 1 to traverse the package list to travel according to the sorting route, and unload the plurality of packages to corresponding destination sorting ports in sequence.

In some embodiments of the present disclosure, the unloading control module 114 may be configured to control the unmanned sorting device 1 to reach the destination sorting port of the package to be sorted; obtain the ground positioning coordinates by controlling the landmark camera 13; determine whether the current sorting port is the destination sorting port of the package to be sorted; and unload the package to be sorted into the destination sorting port in the case where the current sorting port is the destination sorting port of the package to be sorted.

In some embodiments of the present disclosure, the sorting control apparatus 11 is configured to perform operations of implementing the sorting control method according to any of the above-described embodiments (for example, the embodiment of FIG. 7 or FIG. 8).

In some embodiments of the present disclosure, the sorting control apparatus 11 may further be configured to determine whether there is a package that is not sorted by the unmanned sorting device 1; instruct the unloading control module 114 to proceed to perform the operation of controlling the unmanned sorting device 1 to traverse the package list to travel according to the sorting route, and unloading the plurality of packages to the corresponding destination sorting ports in sequence in the case where there is a package that is not sorted by the unmanned sorting device 1; and control the unmanned sorting device 1 to travel to the package supply stations or shelves, and instruct the loading control module 111 to proceed to perform the operation of controlling the unmanned sorting device 1 to load a plurality of packages on the package sorting station in the case where there is no package that is not sorted by the unmanned sorting device 1.

In some embodiments of the present disclosure, the sorting control apparatus 11 may also be configured to determine whether a sorting start instruction is received or whether the unmanned sorting device 1 is fully loaded; instruct the package information sending module 112 to perform the operation of obtaining the package list information and sending the package list information to the sorting control platform 4 in the case where a sorting start instruction is received or the unmanned sorting device 1 is fully loaded; and instruct the loading control module 111 to proceed to perform the operation of controlling the unmanned sorting device 1 to load a plurality of packages on the package sorting station in the case where a sorting start instruction is not received and the unmanned sorting device 1 is not fully loaded.

In some embodiments of the present disclosure, the sorting control apparatus 11 may also be configured to determine whether the package to be sorted has been unloaded into the destination sorting port by the package sensing device 15; inform the sorting control platform 4 that the current package sorting is completed, and then instruct the unloading control module 114 to proceed to perform the operation of controlling the unmanned sorting device 1 to traverse the package list to travel according to the sorting route in the case where the package to be sorted has been unloaded to the destination sorting port.

Figure 10:
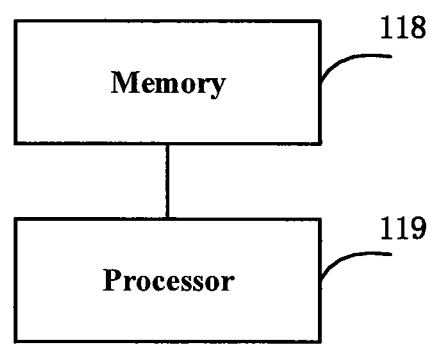
FIG. 10 is a schematic side view of other embodiments of the sorting control apparatus according to the present disclosure.

FIG. 10 is a schematic side view of other embodiments of the sorting control apparatus according to the present disclosure. As shown in FIG. 10, the sorting control apparatus of the present disclosure (for example, the sorting control apparatus 11 according to the embodiment of FIG. 3) may include a memory 118 and a processor 119.

The memory 118 is configured to store instructions.

The processor 119 is configured to execute the instructions, so that the sorting control apparatus 11 performs operations of implementing the sorting control method described in any of the foregoing embodiments (for example, the embodiment of FIG. 7 or FIG. 8).

In the sorting control apparatus provided on the basis of the above-described embodiments of the present disclosure, as compared with the flap truck in the related art, it is more efficient and a plurality of packages are loaded at a time. In the above-described embodiments of the present disclosure, the packages are sorted in a faster speed, and an independent travel lane is not used, while an independent travel lane is required for the flap truck in the related art. In the above-described embodiments of the present disclosure, it is possible to sort a plurality of packages at the same time, thereby improving the sorting efficiency.

According to another aspect of the present disclosure, a non-transient computer-readable storage medium is provided, wherein the non-transient computer-readable storage medium stores computer instructions that, when performed by a processor, implement the sorting control method according to any one of the above-described embodiments (for example, the embodiment of FIG. 7 or FIG. 8).

In the non-transient computer-readable storage medium provided on the basis of the above-described embodiments of the present disclosure, as compared with the flap truck in the related art, it is more efficient and a plurality of packages are loaded at a time. In the above-described embodiments of the present disclosure, the packages are sorted in a faster speed, and an independent travel lane is not used, while an independent travel lane is required for the flap truck in the related art. In the above-described embodiments of the present disclosure, it is possible to sort a plurality of packages at the same time, thereby improving the sorting efficiency.

The sorting control apparatus and the sorting control platform described above may be implemented as a general purpose processor, a programmable logic controller (PLC), a digital signal processor (DSP), an application specific integrated circuit (ASIC), a field-programmable gate array (FPGA) or other programmable logic devices, discrete gates or transistor logic devices, discrete hardware assemblies or any proper combination thereof, which is configured to perform the functions described in the present application.

Hitherto, the present disclosure has been described in detail. Some details well known in the art are not described in order to avoid obscuring the concept of the present disclosure. According to the above description, those skilled in the art would fully understand how to implement the technical solutions disclosed here.

Those of ordinary skill in the art may understand that all or some of the steps in the above-described embodiments may be accomplished by hardware, or by programs to instruct relevant hardware. The programs may be stored in a computer-readable storage medium. The storage medium as mentioned above may be read-only memory, magnetic disk or optical disk, and the like.

Descriptions of the present disclosure, which are made for purpose of exemplification and description, are not absent with omissions or limit the present disclosure to the forms as disclosed. Many modifications and variations are apparent for those skilled in the art. The embodiments are selected and described in order to better explain the principles and actual application of the present disclosure, and enable those skilled in the art to understand the present disclosure so as to design various embodiments adapted to particular purposes and including various modifications.

What is claimed is:

1. A sorting control method, comprising:
controlling an unmanned sorting device to load a plurality of packages;
obtaining package list information, and sending the package list information to a sorting control platform;
receiving a sorting route planned by the sorting control platform;
controlling the unmanned sorting device to traverse a package list to travel according to the sorting route, controlling a vehicle body package sorting outlet aligned with destination sorting ports in sequence, and controlling a plurality of layers of package conveyor belts to unload the plurality of packages to corresponding destination sorting ports in sequence through the vehicle body package sorting outlet, wherein, the vehicle body package sorting outlet is provided at the bottom of a vehicle body, the plurality of layers of package conveyor belts is provided in the unmanned sorting device and is configured to isolate and convey the packages in sequence, a package conveyor belt at the lowermost layer of the plurality of layers of package conveyor belts conveys the packages to be sorted to the vehicle body package sorting outlet in sequence, to unload the packages to be sorted to the corresponding destination sorting ports in sequence through the vehicle body package sorting outlet; and
determining whether a package to be sorted has been unloaded into the destination sorting port by a package sensing device.

2. The sorting control method according to claim 1, wherein the controlling the unmanned sorting device to traverse the package list to travel according to the sorting route, and unloading the plurality of packages to corresponding destination sorting ports in sequence includes:
controlling the unmanned sorting device to reach the destination sorting port of a package to be sorted;
obtaining ground positioning coordinates by controlling a landmark camera;
determining whether the current sorting port is the destination sorting port of the package to be sorted; and
unloading the package to be sorted into the destination sorting port in the case where the current sorting port is the destination sorting port of the package to be sorted.

3. The sorting control method according to claim 2, wherein,
the step of controlling an unmanned sorting device to load a plurality of packages includes: controlling the unmanned sorting device to load a plurality of packages from supply stations or shelves;
the sorting control method further comprising:
determining whether there is a package that is not sorted by the unmanned sorting device;
performing the step of controlling the unmanned sorting device to reach the destination sorting port of the package to be sorted in the case where there is a package that is not sorted by the unmanned sorting device; and
controlling the unmanned sorting device to travel to the package supply stations or shelves, and performing the step of controlling the unmanned sorting device to load a plurality of packages in the case where there is not a package that is not sorted by the unmanned sorting device.

4. The sorting control method according to claim 1, further comprising:
determining whether a sorting start instruction is received or whether the unmanned sorting device is fully loaded;
performing the step of obtaining the package list information and sending the package list information to the sorting control platform in the case where a sorting start instruction is received or the unmanned sorting device is fully loaded; and
proceeding to perform the step of controlling the unmanned sorting device to load a plurality of packages in the case where a sorting start instruction is not received and the unmanned sorting device is not fully loaded.

5. The sorting control method according to claim 1, further comprising:
informing the sorting control platform that the current package sorting is completed, and then proceeding to perform the step of traversing the package list to travel according to the sorting route in the case where the package to be sorted has been unloaded into the destination sorting port.

6. A non-transient computer-readable storage medium, wherein the non-transient computer-readable storage medium stores computer instructions, which when executed by a processor implements the sorting control method according to claim 1.

7. A sorting control apparatus, comprising:
a memory for storing instructions; and a processor coupled to the memory, which is configured to execute a method for performing instructions comprising:

controlling an unmanned sorting device to load a plurality of packages;

obtaining package list information, and sending the package list information to a sorting control platform;

receiving a sorting route planned by the sorting control platform;

controlling the unmanned sorting device to traverse a package list to travel according to the sorting route, controlling a vehicle body package sorting outlet aligned with destination sorting orts in sequence, and controlling a plurality of layers of package conveyor belts to unload the plurality of packages to corresponding destination sorting ports in sequence through the vehicle body package sorting outlet, wherein, the vehicle body package sorting outlet is provided at the bottom of a vehicle body, the plurality of layers of package conveyor belts is provided in the unmanned sorting device and is configured to isolate and convey the packages in sequence, a package conveyor belt at the lowermost layer of the plurality of layers of package conveyor belts conveys the packages to be sorted to the vehicle body package sorting outlet in sequence, to unload the packages to be sorted to the corresponding destination sorting ports in sequence through the vehicle body package sorting outlet; and determining whether a package to be sorted has been unloaded into the destination sorting port by a package sensing device.

8. The sorting control apparatus according to claim 7, the controlling the unmanned sorting device to traverse the package list to travel according to the sorting route, and unloading the plurality of packages to corresponding destination sorting ports in sequence includes:

controlling the unmanned sorting device to reach the destination sorting port of a package to be sorted;

obtaining ground positioning coordinates by controlling a landmark camera;

determining whether the current sorting port is the destination sorting port of the package to be sorted; and unloading the package to be sorted into the destination sorting port in the case where the current sorting port is the destination sorting port of the package to be sorted.

9. The sorting control apparatus according to claim 8, wherein, the controlling an unmanned sorting device to load a plurality of packages includes: controlling the unmanned sorting device to load a plurality of packages from supply stations or shelves;

the instructions further comprise:

determining whether there is a package that is not sorted by the unmanned sorting device;

performing the step of controlling the unmanned sorting device to reach the destination sorting port of the package to be sorted in the case where there is a package that is not sorted by the unmanned sorting device; and controlling the unmanned sorting device to travel to the package supply stations or shelves, and performing the step of controlling the unmanned sorting device to load a plurality of packages in the case where there is not a package that is not sorted by the unmanned sorting device.

10. The sorting control apparatus according to claim 7, wherein, the instructions further comprise:

determining whether a sorting start instruction is received or whether the unmanned sorting device is fully loaded;

performing the step of obtaining the package list information and sending the package list information to the sorting control platform in the case where a sorting start instruction is received or the unmanned sorting device is fully loaded; and proceeding to perform the step of controlling the unmanned sorting device to load a plurality of packages in the case where a sorting start instruction is not received and the unmanned sorting device is not fully loaded.

11. An unmanned sorting device, comprising:

a package scanning camera provided on the top of the unmanned sorting device, and configured to collect package information, identify packages, and send the package information to a sorting control apparatus in the case where the unmanned sorting device loads a plurality of packages;

the sorting control apparatus configured to obtain package list information, and send the package list information to a sorting control platform, so as to allow the sorting control platform to plan a sorting route; receive the sorting route planned by the sorting control platform; control the unmanned sorting device to traverse the package list to travel according to the sorting route, and unload the plurality of packages to corresponding destination sorting ports in sequence a vehicle body package sorting outlet provided at the bottom of a vehicle body, wherein the sorting control apparatus is further configured to control the vehicle body package sorting outlet aligned with destination sorting ports in sequence, so that the packages to be sorted are unloaded into the destination sorting port through the vehicle body package sorting outlet in sequence;

a package sensing device configured to detect whether a package falls into the destination sorting port; and a plurality of layers of package conveyor belts, provided in unmanned sorting device, and configured to isolate and convey the packages in sequence, wherein a package conveyor belt at the lowermost layer of the plurality of layers of package conveyor belts conveys the packages to be sorted to the vehicle body package sorting outlet in sequence, to unload the packages to be sorted to the corresponding destination sorting ports in sequence through the vehicle body package sorting outlet.

12. The unmanned sorting device according to claim 11, further comprising a landmark camera, wherein:

the sorting control apparatus is further configured to control the unmanned sorting device to reach the destination sorting port of the package to be sorted, wherein a plurality of sorting ports are provided on the ground, and one sorting port corresponds to one package destination;

the landmark camera is provided at the bottom of the unmanned sorting device, and configured to scan the ground landmarks, so as to allow the sorting control apparatus to determine whether the current sorting port is the destination sorting port of the package to be sorted, wherein one ground landmark is configured to identify one sorting port; and the sorting control apparatus is further configured to unload the package to be sorted to the destination sorting port in the case where the current sorting port is the destination sorting port of the package to be sorted.

13. The unmanned sorting device according to claim 11, wherein:
the package sensing device is further configured to detect whether a package falls into the destination sorting port in the case where the package reaches the destination sorting port and the package is sorted and unloaded; and send a message to the sorting control apparatus to indicate that the package has been successfully sorted in the case where the package falls into the destination sorting port.

14. The unmanned sorting device according to claim 11, further comprising:
a universal wheel configured to drive the unmanned sorting device to move forwards, backwards, leftwards and rightwards according to the instructions of the sorting control apparatus; and
a power unit configured to provide power for the movement of the vehicle body and the movement of the package conveyor belt.

15. The unmanned sorting device according to claim 11, wherein the sorting control apparatus comprises:
a loading control module;
a package information sending module;
a sorting route receiving module; and
an unloading control module.

16. A sorting control system, comprising:
a sorting control platform configured to receive the package list information sent by an unmanned sorting device; plan a sorting route according to the package list information, and send the sorting route to the unmanned sorting device; and
the unmanned sorting device comprising a sorting control apparatus, wherein the sorting control apparatus is configured to control the unmanned sorting device to load a plurality of packages; obtain the package list information, and send the package list information to the sorting control platform; receive the sorting route planned by the sorting control platform; control the unmanned sorting device to traverse the package list to travel according to the sorting route, and control the unmanned sorting device to unload a plurality of packages to corresponding destination sorting ports in sequence, and the unmanned sorting device is the unmanned sorting device according to claim 11.

17. The sorting control system according to claim 16, further comprising:
sorting ports provided on the ground, wherein one sorting port corresponds to one package destination; and
ground landmarks provided on the ground and configured to identify sorting ports, wherein one ground landmark is configured to identify one sorting port, wherein the unmanned sorting device is further configured to sort the packages according to the ground landmark, and unload the packages after reaching the landmark of the destination sorting port.

* * * * *

UNITED STATES PATENT AND TRADEMARK OFFICE
CERTIFICATE OF CORRECTION

PATENT NO. : 11,801,532 B2
APPLICATION NO. : 17/772433
DATED : October 31, 2023
INVENTOR(S) : Song Han Page 1 of 1

It is certified that error appears in the above-identified patent and that said Letters Patent is hereby corrected as shown below:

In the Specification

Column 3, Line 20: Please insert a paragraph break between "sorted." and "In some"

Column 9, Line 56: Please correct "include;" to read --include:--

Column 9, Line 59: Please correct "camera whether" to read --camera 13; whether--

In the Claims

Column 15, Line 13, Claim 7: Please correct "orts" to read --ports--

Column 16, Line 28, Claim 11: Please correct "sequence" to read --sequence;--

Signed and Sealed this
Thirteenth Day of February, 2024

Katherine Kelly Vidal
*Director of the United States Patent and Trademark Office*